US 6,608,969 B2

(12) United States Patent
Schröder

(10) Patent No.: US 6,608,969 B2
(45) Date of Patent: *Aug. 19, 2003

(54) PHOTOGRAPHIC FUNCTIONAL UNIT AND PHOTOGRAPHIC CAMERA AND METHOD FOR THE ASSEMBLY THEREOF

(75) Inventor: Rolf Schröder, Zomeding (DE)

(73) Assignee: Agfa Gevaert N.V. (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/851,012

(22) Filed: May 8, 2001

(65) Prior Publication Data

US 2001/0041067 A1 Nov. 15, 2001

(30) Foreign Application Priority Data

May 9, 2000 (DE) .......................................... 100 22 498

(51) Int. Cl.[7] .............................................. G03B 17/02
(52) U.S. Cl. ........................... 396/6; 396/539; 396/541
(58) Field of Search ............................ 396/6, 176, 535, 396/539, 541, 195; 439/929

(56) References Cited

U.S. PATENT DOCUMENTS 5,003,330 A * 3/1991 Kotani et al. ............... 396/176
5,692,221 A * 11/1997 Tobioka et al. ................ 396/6

* cited by examiner

Primary Examiner—Russell Adams
Assistant Examiner—Rochelle Blackman
(74) Attorney, Agent, or Firm—Connolly Bove Lodge & Hutz LLP

(57) ABSTRACT

The following components can be fitted alternatively to the front of a photographic camera subassembly (FU), which is designed for recording photographic images on a photographic film (201) which is disposed therein in a light-tight manner. These components includes a first type housing front part (5), which is matched to the dimensions of the camera subassembly (FU) and with which the camera subassembly (FU) forms an operational camera without a flash device; and a second type housing front part (560) which comprises an extension section (561) which protrudes beyond a lateral edge (S) of the camera subassembly (FU), and the extension section (561) of which, together with a supplementary housing part (360) which can be inserted at the back between the camera subassembly (FU) and the extension section (561), encloses a receiver space (E) for a flash device (6) which is disposed at the side of the camera subassembly (FU), and which forms an operational camera with a flash device.

35 Claims, 10 Drawing Sheets

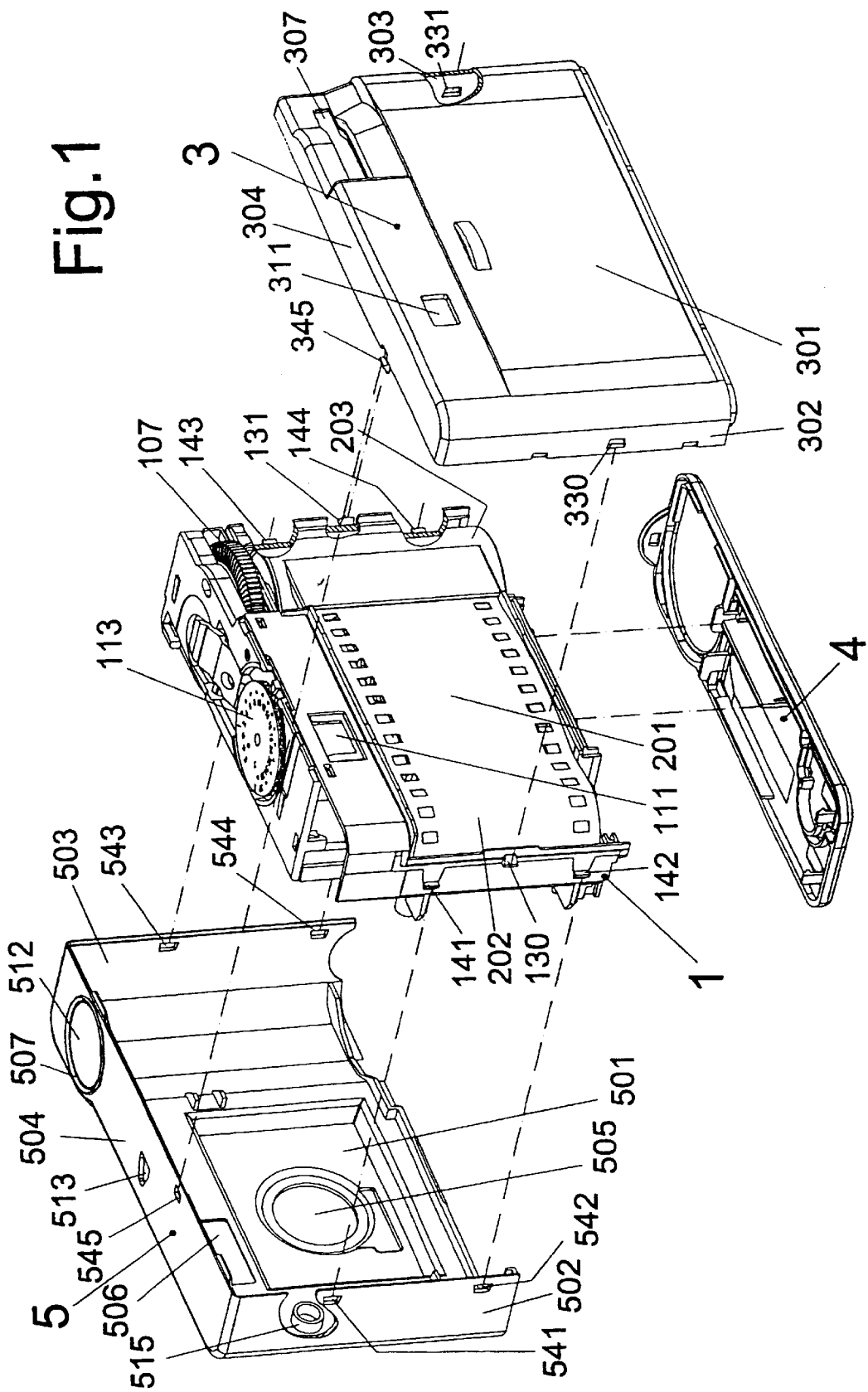

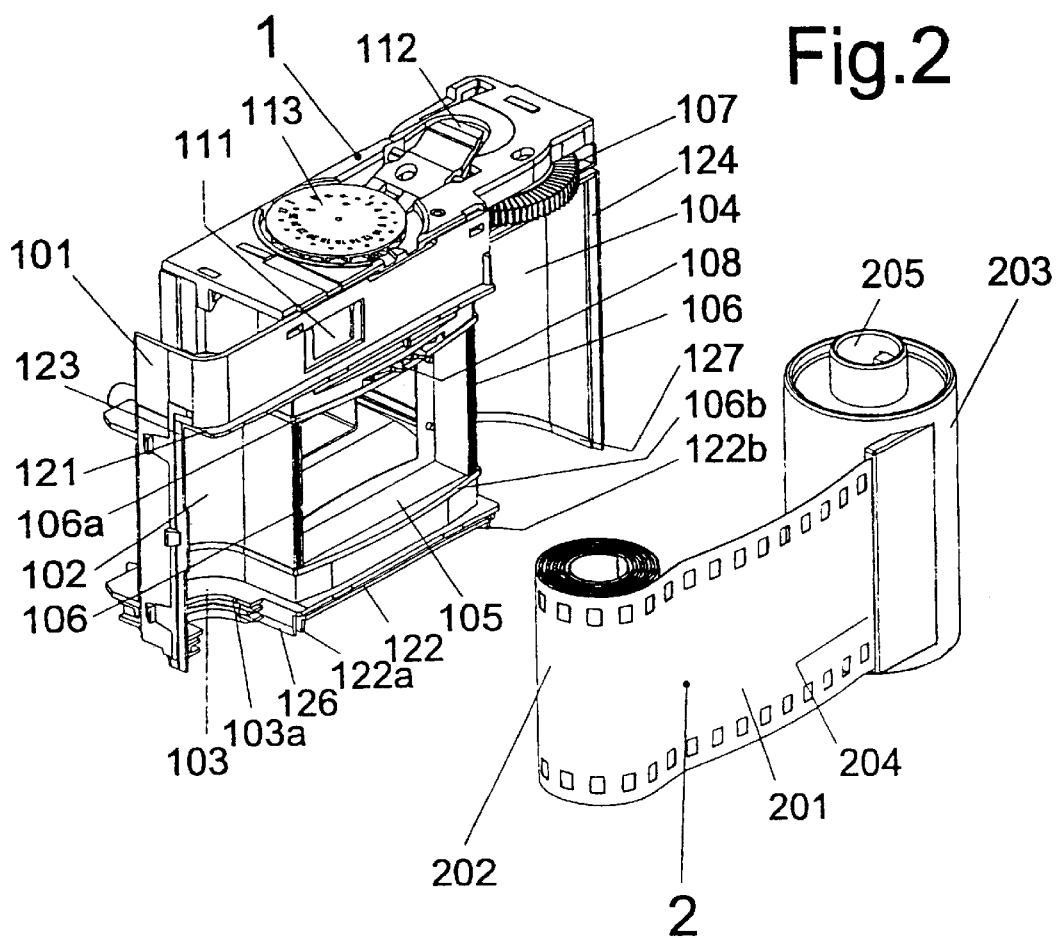
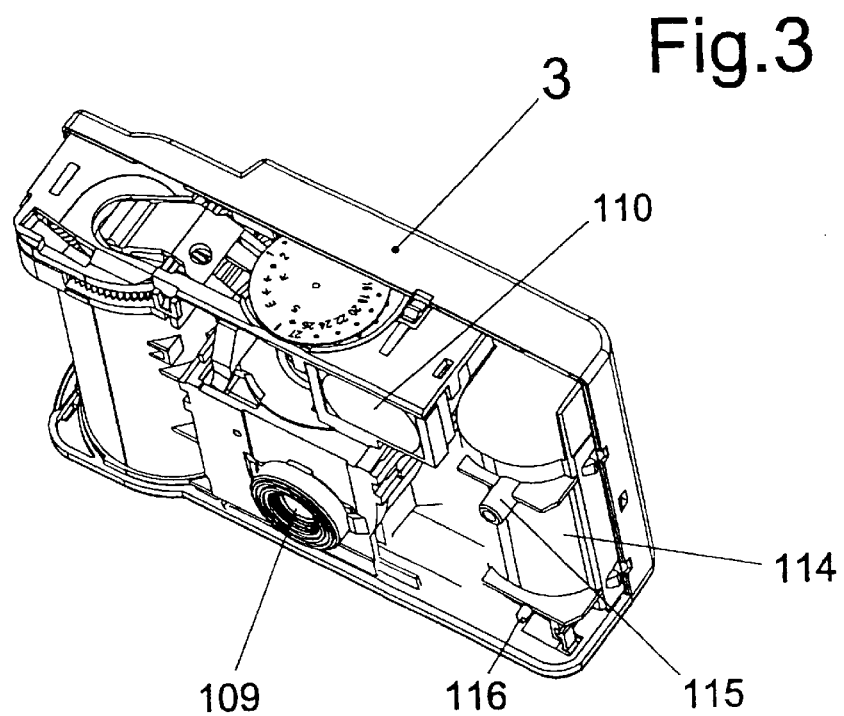

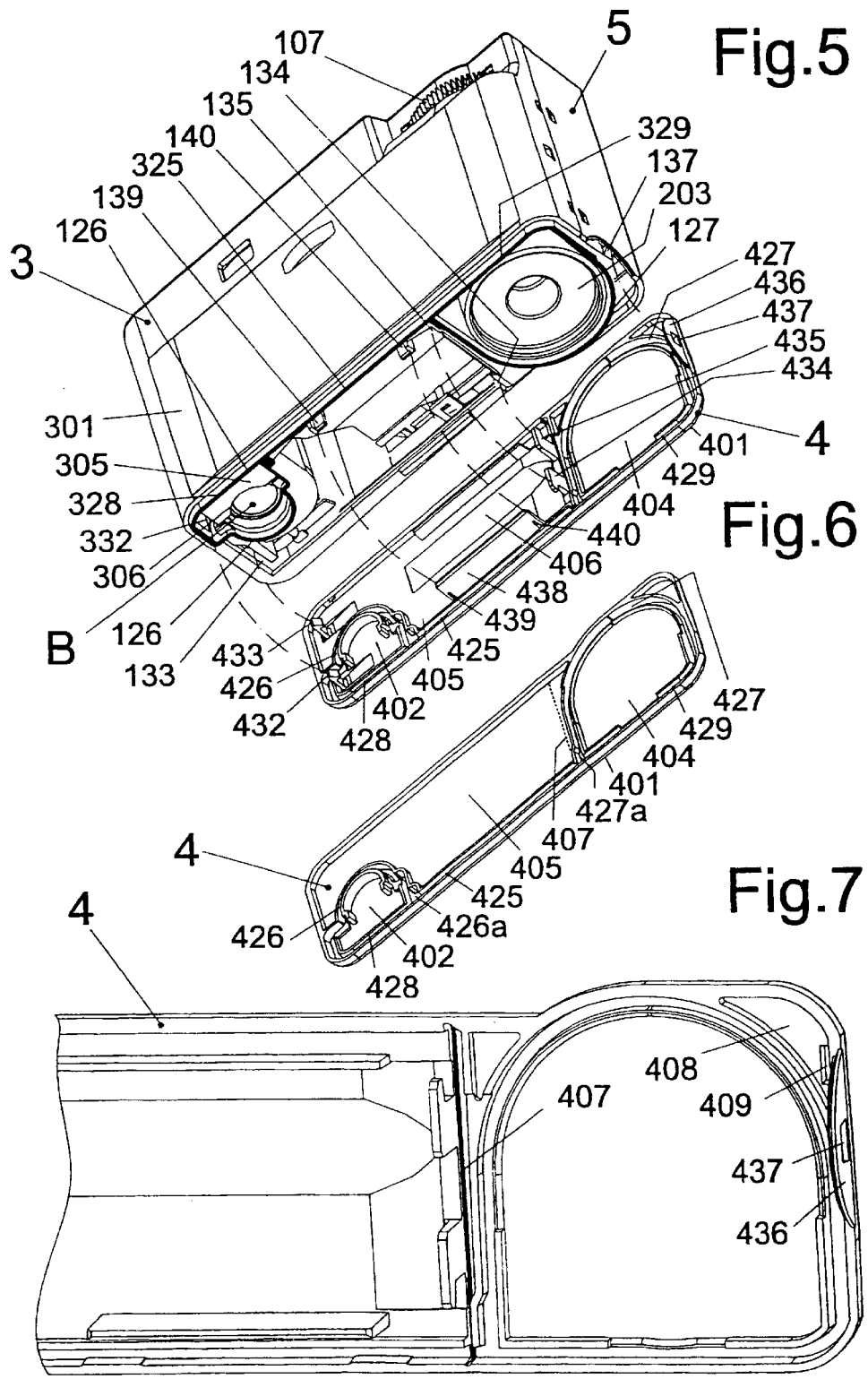

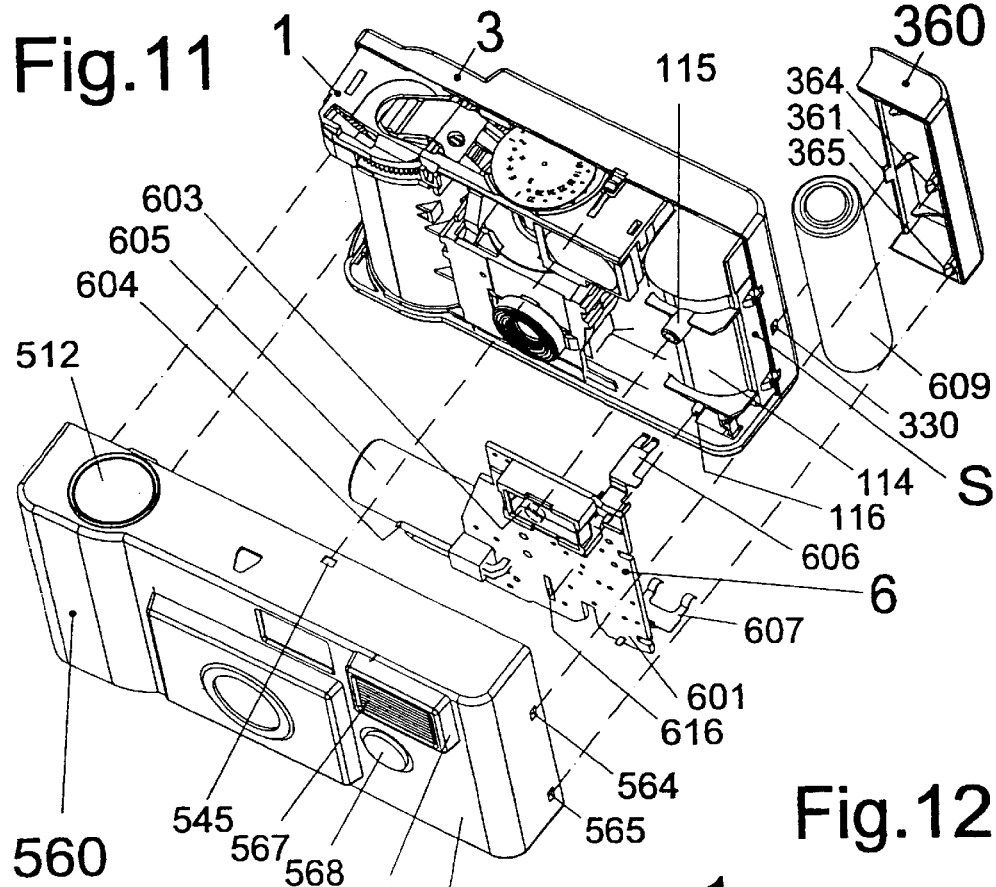

PHOTOGRAPHIC FUNCTIONAL UNIT AND PHOTOGRAPHIC CAMERA AND METHOD FOR THE ASSEMBLY THEREOF

This invention relates to a photographic functional unit and a photographic camera, preferably a disposable camera, and to a method for the assembly thereof.

Disposable cameras are cameras in which a photographic film is first inserted, not by the end user of the camera, but by the manufacturer of the camera during the assembly thereof. The end user who acquires a disposable camera of this type delivers it, after using it according to the instructions, i.e. after taking a number of photographs, with the film which has been exposed image by image still contained in the camera, to a photographic developing and printing organisation, where the camera is opened in order to remove the exposed film contained therein and to develop and print the latter according to the instructions. After the film has been removed, the opened camera or parts thereof are sent from the developing and printing organisation for reuse or to a recycling process.

Various designs of disposable cameras of this type are known. For example, DE 38 33 924 C2 discloses a disposable camera with a housing, the base of which comprises a baseplate which is joined to the remainder of the housing via a hinge and which can be held in a closed position by means of hook-like latches which interlock with corresponding recesses on a housing front wall. When the roll film contained in the camera is removed from the camera after exposure, the baseplate is folded down after releasing the locking joints and the housing is thereby opened.

A disposable camera is known from DE 37 351 116 A1 in which a roll film which is perforated on both sides can be inserted as a film supply roll in a film supply chamber, and which comprises a film cartridge into which the film can be wound during the image by image advance thereof into a cartridge receiver chamber of a camera housing consisting of a plastics material, wherein a film guide channel which is curved backwards in the direction of film guidance is disposed between the two chambers. The film guide channel is formed by an exposure aperture on the housing and by a housing back part which can be fitted to the housing from the back and on to which a housing base part which protrudes at right angles is injection moulded.

DE 37 40 572 C2 discloses a disposable camera which in principle is of similar construction, wherein the devices for accommodating a roll film and for the image by image advance of a roll film which is perforated on both sides are present on a core subassembly which is disposed between a camera back part and a camera front part.

EP 0 632 314 B1 discloses a disposable camera for a film cartridge and a photographic film of the 135 system, comprising a core subassembly, a housing back part which comprises a base part which projects at right angles, and a housing front part, wherein a central housing base part which protrudes a right angles and two basal flaps are fixed to the housing back part. The core subassembly comprises a film cartridge chamber for receiving a film cartridge, and a film supply chamber for receiving a loose film supply roll, which is formed by winding film on to a winding mandrel which serves as an auxiliary tool and which together with the winding mandrel can be swivelled radially in the film supply chamber of the core subassembly. After fitting the housing back part to the back of the core subassembly, the winding mandrel is pulled off axially from the film supply roll and from the film supply chamber of the core subassembly, wherein one edge of the film supply roll is seated against a radially inwardly projecting, sickle-shaped collar on an internal face of the film supply chamber and therefore cannot unwantedly be pulled outwards, due to friction, from the winding mandrel when the latter is pulled off radially from the film supply roll. Finally, the film cartridge chamber and the film supply chamber of the core subassembly are closed from below in a light-tight manner by folding up basal flaps, which are fixed in the manner of hinges to the housing back part, to the underside of the core subassembly.

A camera for APS films, which is preferably constructed as a disposable camera and which comprises a core subassembly, a housing back part and a housing front part, is known from DE 196 00 270 A1, for example.

Disposable cameras which possess a basic construction of this type and which comprise a built-in flash device, the components of which are disposed on a board which can be fitted to a core subassembly of the camera, are disclosed EP 0 551 897 A1 and in U.S. Pat. No. 5,608,486, for example.

The underlying object of the present invention is to provide a design which enables photographic cameras, preferably disposable cameras, with and without a built-in flash device, to be constructed in a simple manner, and which enables them to be composed of substantially identical subassemblies, whilst at the same time firstly keeping the external contours of the camera without a built-in flash device as small as possible and secondly, in the camera with a built-in flash device, providing the latter substantially outside said contours but inside a housing as a whole.

A further underlying object of the present invention is to provide a method for the simple assembly of photographic cameras of this type, with and without a built-in flash device.

Yet another underlying object of the present invention is to provide a method by which a camera without a built-in flash device can be converted in a simple manner into a camera with a built-in flash device.

These objects are achieved according to the invention by the features according to claims 1, 3, 17, 18 and 31, respectively.

Further developments of the invention are given in the subsidiary claims which follow each of the aforementioned claims.

Preferred embodiments of the invention are described in detail below with reference to the drawings, where:

FIG. 1 is an exploded, perspective view, as seen obliquely from behind, of an embodiment of a camera according to the invention without a flash device;

FIG. 2 is an exploded, perspective view, as seen obliquely from behind, of a core subassembly of the camera shown in FIG. 1 and of a photographic film unit inserted therein;

FIG. 3 is an exploded, perspective view, as seen obliquely from the front and the top, of a photographic functional unit which is formed from the subject of FIG. 2 with a housing back part and housing base part fitted thereon;

Figure 8:
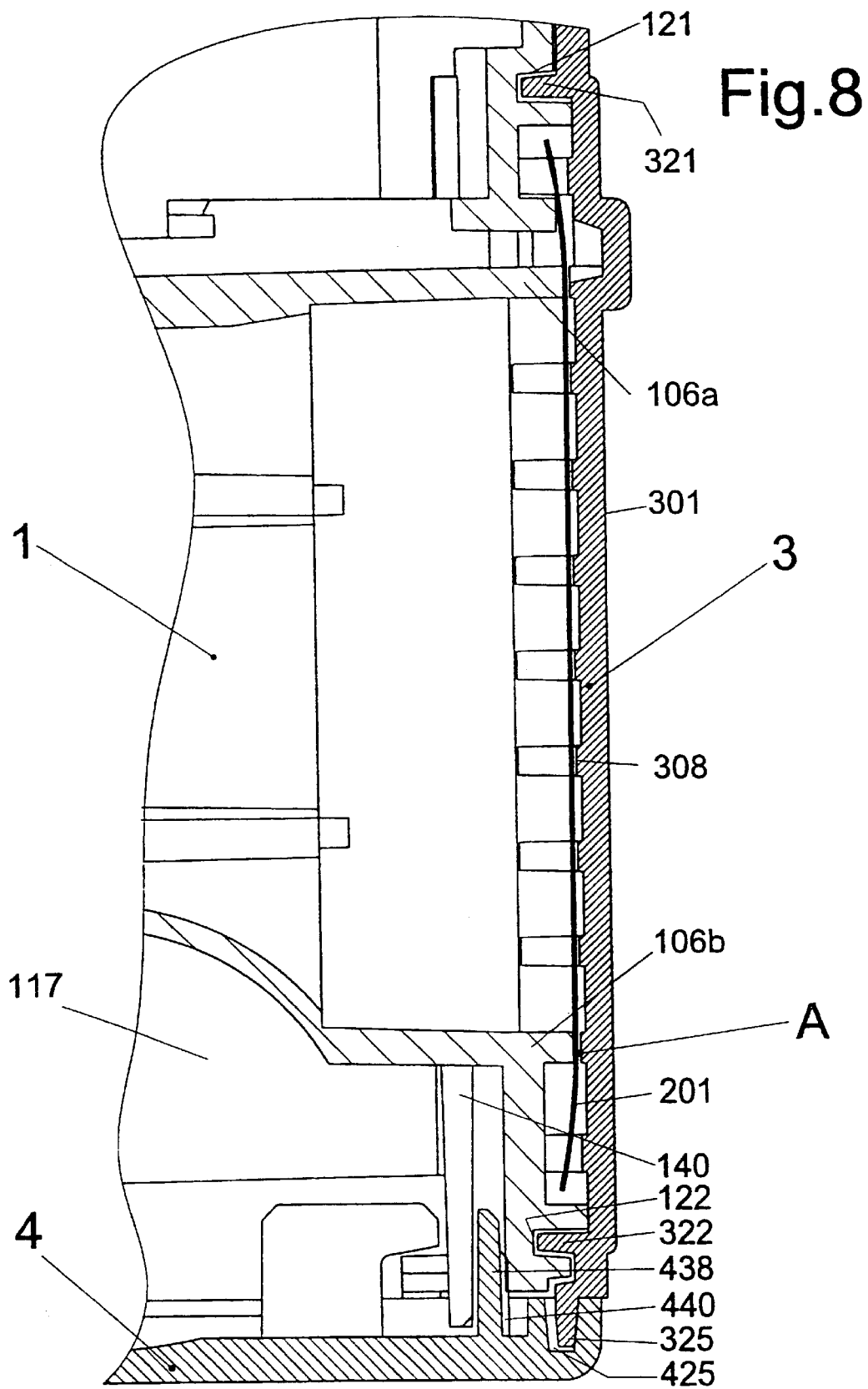
Figure 9:
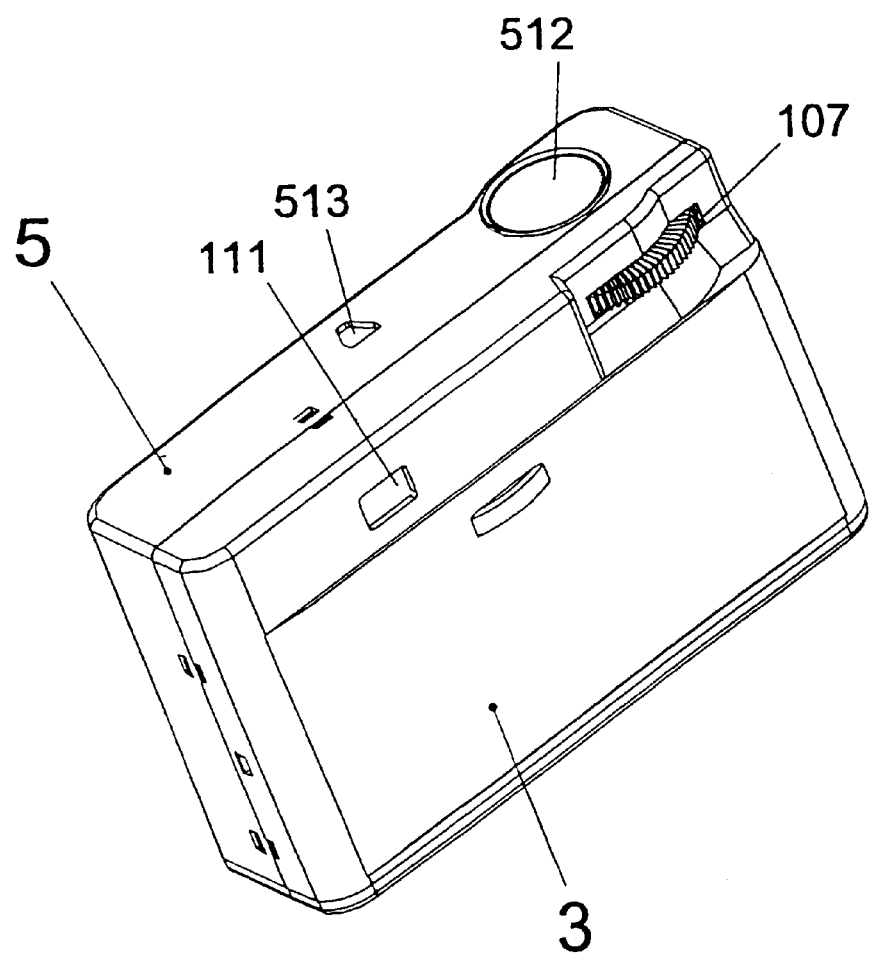
Figure 10:
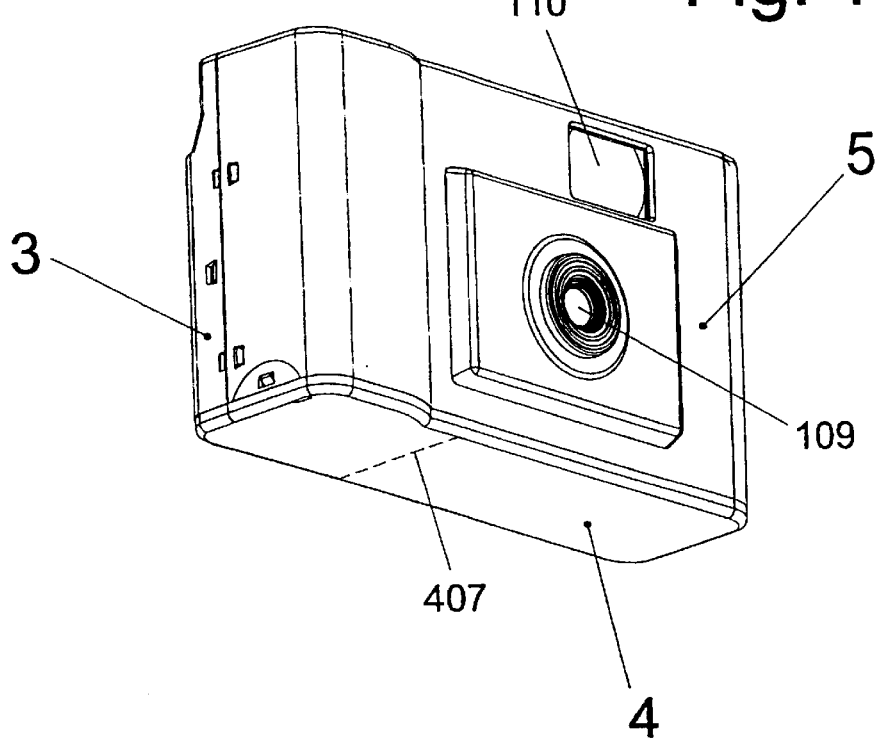
Figure 10A:
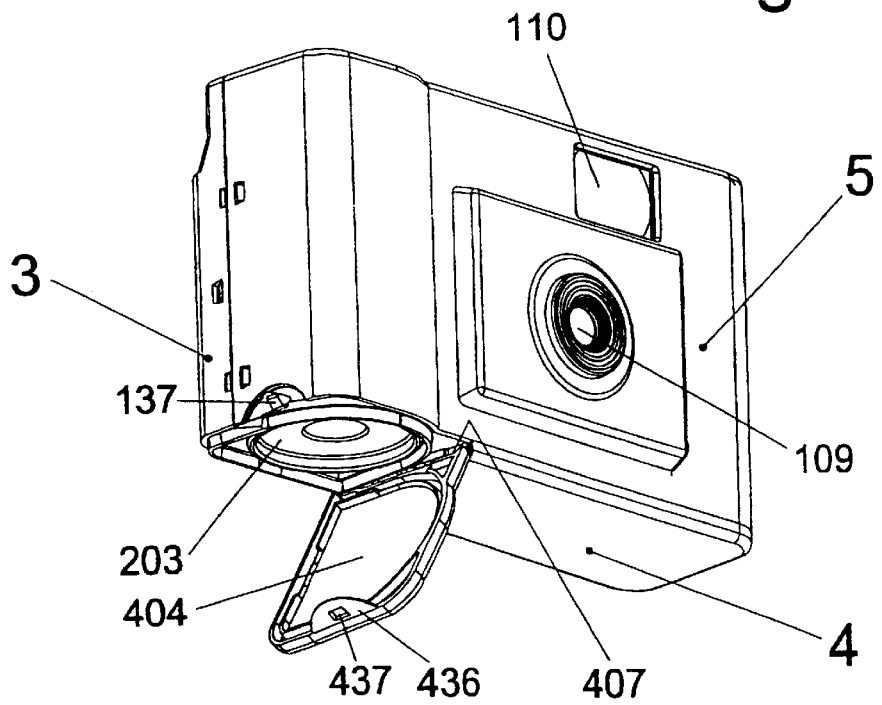
Figure 13:
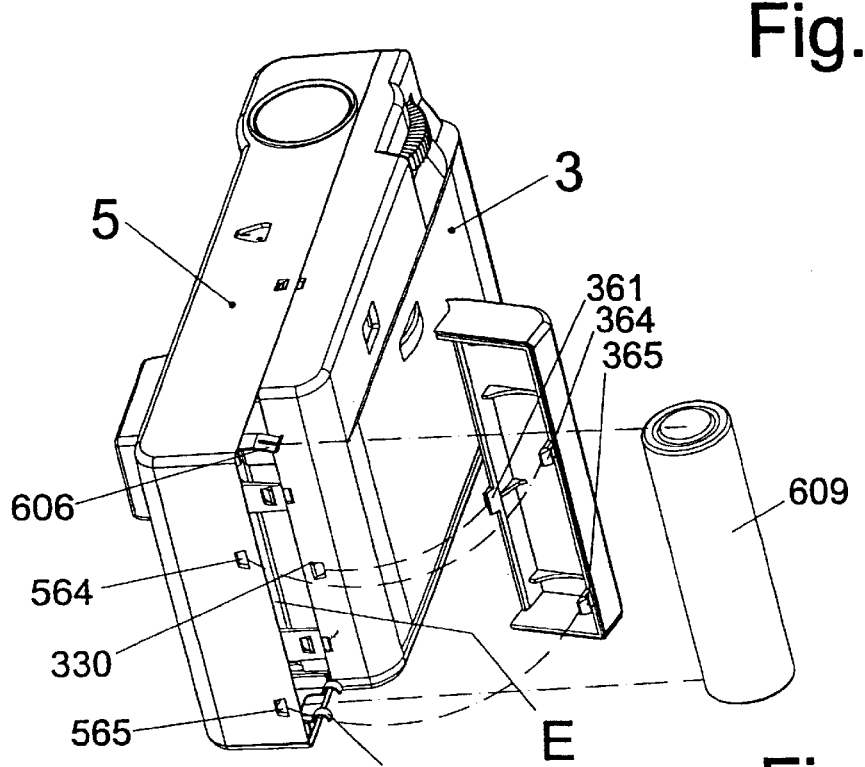
Figure 14:
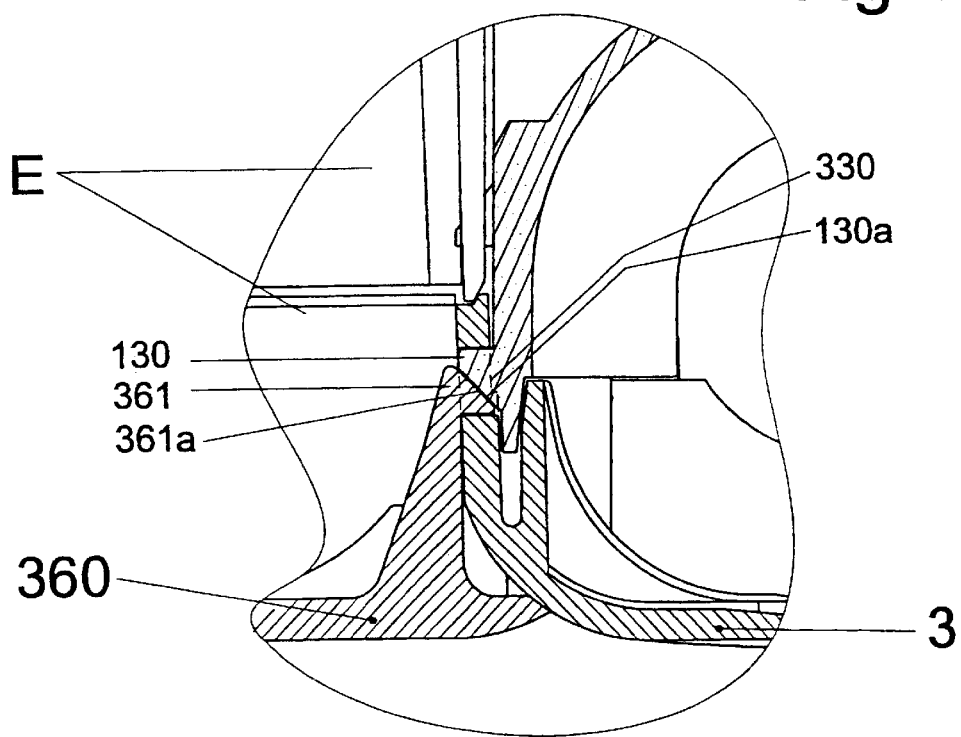
Figure 15:
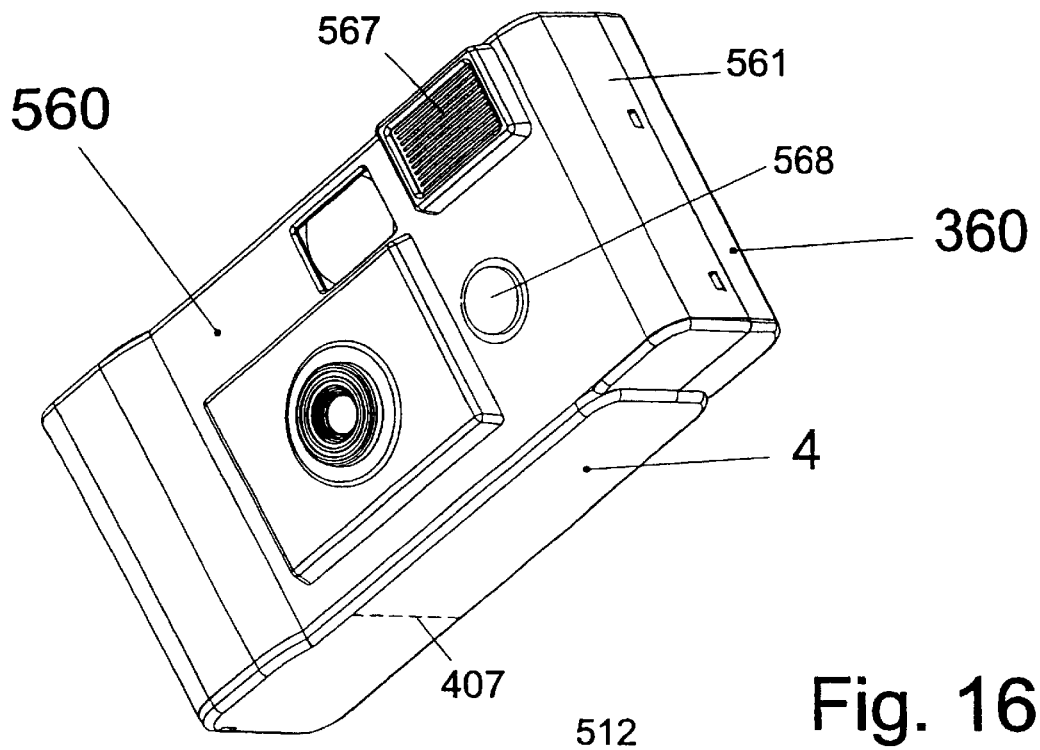
Figure 16:
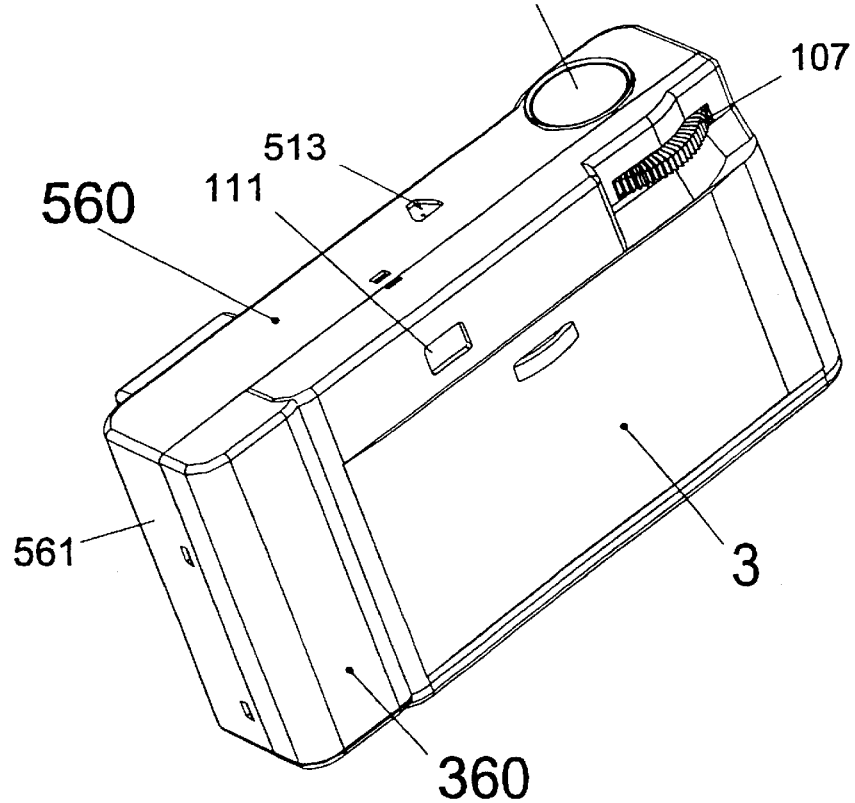

FIG. 5 is a perspective illustration, as seen obliquely from the back and from below, of the camera shown in FIG. 1, with the housing back part and the housing front part fitted to the core subassembly, and includes a separate illustration of the housing base part in its folded down position, FIG. 6 shows the housing base part in the same perspective illustration as that of FIG. 5, but with the omission of part of the structural elements for the sake of clarity;

FIG. 7 is an enlarged illustration, as seen from the top right, of the housing base part shown in FIG. 5;

FIG. 8 is a longitudinal section though the parts of the camera shown in FIG. 1, in their assembled state;

FIG. 9 is a perspective illustration, as seen from the top right, of the camera shown in FIG. 1 in its completely assembled state;

FIG. 10 is a perspective illustration, as seen obliquely from below, of the camera shown in FIG. 1 in its completely assembled state;

FIG. 10a illustrates parts of the camera shown in FIG. 10, in which a film cartridge chamber covering region of the housing base part is folded down in order to remove the film cartridge, FIG. 11 is a perspective, exploded view, as seen obliquely from the front and from above, of an embodiment of a camera according to the invention with a flash device;

FIG. 12 is a perspective illustration, as seen obliquely from the front, of the camera shown in FIG. 11, with its housing front part folded down;

FIG. 13 is a perspective, exploded view, as seen obliquely from the back, of the camera shown in FIG. 11;

FIG. 14 is a section on an enlarged scale through parts of the camera shown in FIG. 11;

FIG. 15 is a perspective illustration, as seen obliquely from the front and from below, of the camera shown in FIG. 11 in its completely assembled state; and FIG. 16 is a perspective illustration, as seen obliquely from the back and from above, of the camera shown in FIG. 11 in its completely assembled state.

The embodiments of a camera according to the invention with and without a built-in flash device which are illustrated in the drawings are disposable cameras in the sense of the explanations given at the outset.

Both designs of camera are based on a functional unit as shown in FIG. 3 which is identical in both designs. The functional unit and a housing front part for the first of the aforementioned designs without a flash device are described in more detail below with reference to FIGS. 1 to 10, whilst the design with a flash device is described in more detail with reference to FIGS. 11 to 16.

The functional unit FU which is explained with reference to FIGS. 1 to 10 and which is illustrated separately in FIG. 3 in particular comprises the following subassemblies:

a core subassembly 1 comprising devices which are described in greater detail below, for film guidance, for film advance and for film metering, and comprising a taking lens, a viewfinder and a photographic shutter, a photographic film unit 2, a housing back part 3 which can be inserted in the core subassembly 1 from the back, and a housing base part 4 which can be inserted in the core subassembly 1 from below.

A housing front part 5 can be fitted to the aforementioned functional unit FU.

The aforementioned subassemblies 1 to 4 of the functional unit FU, as well as the aforementioned subassembly 5, are described in greater detail below. The components of the individual subassemblies are denoted by three-digit reference numerals, the first digit of which denotes the subassembly of which the component forms part.

Film Unit

Figure 4:
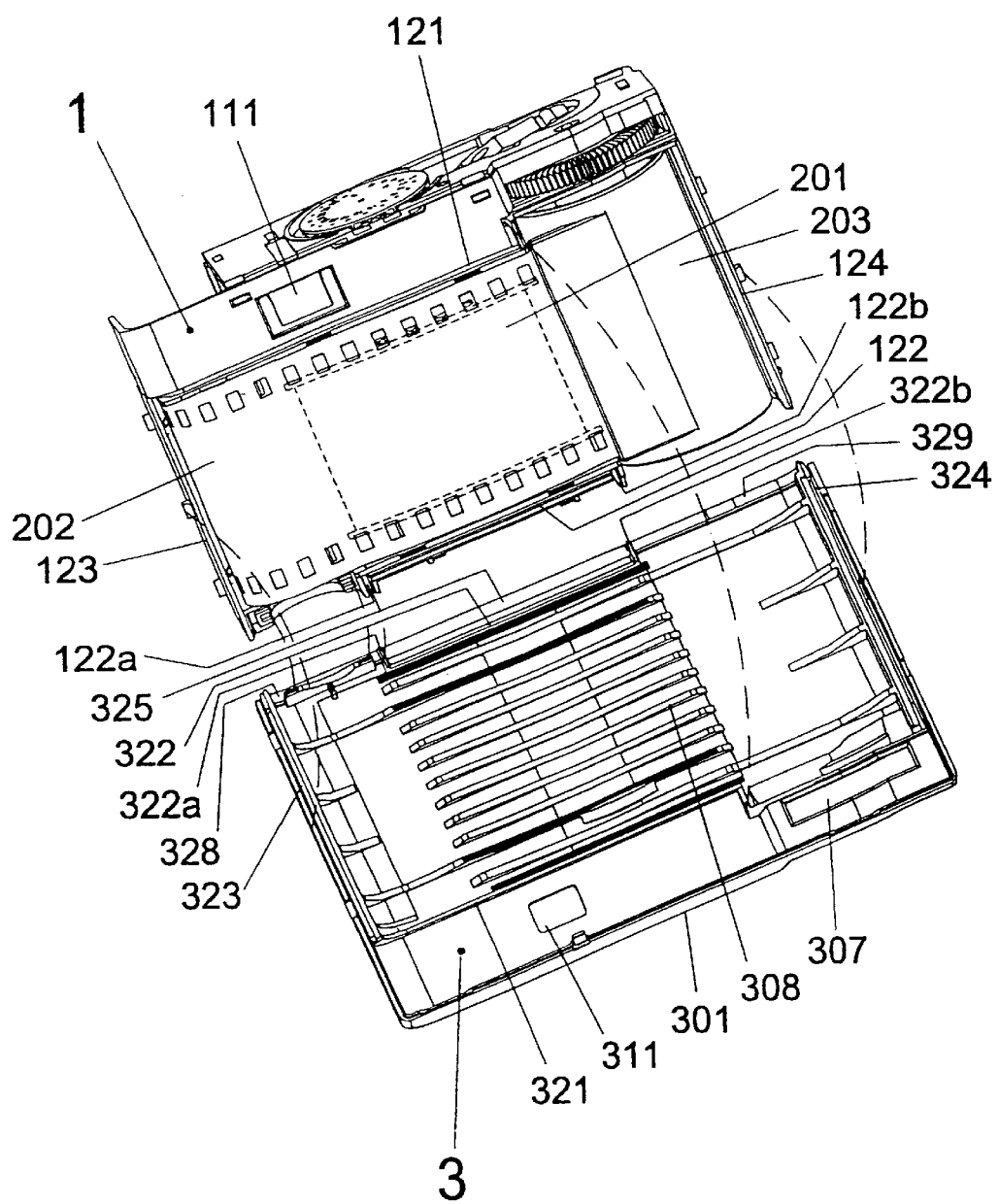
FIG. 4 is a perspective illustration showing the core subassembly as seen from the back and the housing back part shown folded down as seen from within.

The film unit 2 will first be described in detail. It is illustrated in FIG. 2 as an exploded view together with the core subassembly 1, and is shown in FIGS. 1 and 4 after its insertion into the core subassembly 1. The film unit 2 comprises a photographic roll film 201. As can be seen from FIG. 2, one end of the film 201 forms a loose film supply roll 202, whilst its other end passes through a mouth 204 of a film cartridge 203 of a type of construction known in the art and is fixed to a film spool, which is not illustrated but which is rotatably mounted in the interior of the film cartridge 203 and comprises an outwardly projecting coupling part 205 which enables the film spool to be driven by a film advance device of the camera.

In the film unit 2 shown in the drawings, the film 201 and the film cartridge 203, together with the film spool, which is not illustrated, and the coupling part 205 which is attached thereto, are fashioned according to the known "135" small image system for 35 mm roll films. The film 201 accordingly has continuous perforations at both its edges.

Core Subassembly

The core subassembly 1 is described next. It consists of a main body 101 which is injection moulded in one-piece from a light-tight plastics material. The main body forms a film supply chamber 102 which is open at the back for receiving the film supply roll 202 of the film unit 2, a film cartridge chamber 104 which is open at the back for receiving the film cartridge 203 of the film unit 2, and a light well 105 which is situated between the two chambers 102, 104 and which comprises a window-like film exposure frame 106 which has a slightly convex curvature towards the back in the direction of film advance. The film exposure frame has top and bottom film guidance runners 106a, 106b, against each of which a front side of a film portion of the film 201 is seated between the film supply roll 202 and the film cartridge 203 (see FIG. 8). On its lower, radially inwardly oriented wall element 103, the film supply chamber 102 forms a U-shaped aperture 103a which is open at the back, whilst the film cartridge chamber 104 is completely open at the bottom.

Moreover, a film advance device is inserted in the core subassembly 1. This film advance device is known in principle in the art and is in engagement with the coupling part 205 of the film cartridge 203 of the film unit 2 which is inserted in the core subassembly 1. Of this advance device, only part of a knurled advance wheel 107, which can be operated manually by the user of the camera, is shown in the drawings. Using this film advance device, the film 201 can be pulled off from the film supply roll 202 and can be advanced step-wise into the film cartridge 203 via the film exposure frame 106. The film advance device and an associated transport locking device are preferably constructed according to the prior German Patent Application 199 01 578.3 (DE-OS 199 01 578 A1).

Furthermore, the core subassembly 1 is equipped with a film metering device, which is known in principle in the art, for measuring the film length advanced each time. Of this film metering device, only part of a sprocket wheel 108 thereof, which engages in the top film perforation of the film 201, is visible in FIG. 2. The sprocket wheel 108 and the mechanical shifting elements which cooperate therewith are preferably constructed according to the prior German Patent Application 199 01 579.1 (DE-OS 199 01 579 A1).

In addition, a taking lens 109 is a fixed to the front side of the core sub-assembly 1, coaxially with a centre line of the light well 105, and serves for the optical imaging of an object to be photographed on the film section of the photographic film 201 which is situated in the exposure frame 106. Since the exposure frame 106 is curved backwards, the requirements for the correction of imaging errors of the lens 109 are reduced insofar as they relate to image field curvature.

A viewfinder which is provided in the core subassembly 1 serves to identify the region of the object to be photographed which is depicted on the film section of the film 201 which is situated in each case in the region of the film exposure frame 106. The viewfinder consists in the known manner of a viewfinder lens 110 and a viewfinder eyepiece 111, both of which are fixed to the core sub-assembly 1.

A photographic shutter, which is known in principle and which can be actuated by means of a release device, is situated in the path of the light beam behind the taking lens 109 in the core subassembly 1. Of the release device, the drawings only illustrate a swivel-mounted release lever 112, and a flexible release diaphragm 512 which acts on a free end of the release lever 112 and which is fixed to the housing front part 5 which is described in detail below. The photographic shutter and its release device are preferably constructed according to the prior German Patent Application 199 01 577.5 (DE-OS 199 01 577 A1).

Furthermore, a frame counter device which is known in principle is inserted in the main body 101 of the core subassembly 1. The drawings only schematically illustrate a rotatably mounted frame counter wheel 113 of the frame counter device. This is moved on by one counting step when the film is advanced by one frame step. The frame counter device is preferably constructed according to the prior German Patent Application 199 01 576.7 (DE-OS 199 01 576 A1).

A forwardly projecting mounting peg 115 and a thinner mounting pin 116, which is likewise oriented towards the front and the function of which is described in more detail below, are injection moulded on a curved wall 114 of the film supply chamber 102 which is disposed on the front of the main body 101 of the core subassembly 1.

In addition, an elongated cavity 117 is formed on the core subassembly 1 underneath the light well 105. This cavity extends perpendicularly to the optical axis of the taking lens 109 and parallel to the direction of film advance and is sized so that it is capable of receiving an electrical storage capacitor if a flash device is incorporated in the camera, as described in more detail below. Part of this cavity 117 can be seen in section in FIG. 8.

Housing Back Part

The housing back part 3 will be described next. This is again injection moulded in one piece from a light-tight plastics material and is shaped so that it can be fitted to the back of the core subassembly 1 from the back. It comprises an externally flat back wall 301, which is adjoined along its lateral edges and its top edge by side and top wall elements 302, 303, and 304, respectively, which project perpendicularly from the back wall face and which enclose back edge parts of the core subassembly 1. There is no perpendicularly projecting wall element at the bottom edge of the back wall 301, but instead there is merely a small projection 305 which projects perpendicularly to the back wall 301 and which comprises a concave semicircular recess 306, which together with the aperture 103a in the wall element 103 of the film supply chamber 102 of the core subassembly 1 forms an approximately circular aperture B, the function of which is explained in detail below.

On the back wall 301 there is a slot-shaped aperture 307 and a rectangular aperture 311, which when the housing back part 3 is fitted to the core subassembly 1 enable part of the film advance wheel 107 to pass through the core subassembly 1 backwards and which enable the viewfinder eyepiece 111 of the core subassembly to be viewed from the back, respectively. A plurality of film contact pressure ribs 308, which extend parallel to each other in the direction of film advance and which possess a concave curvature, is provided on the inner face of the back wall 301.

When the housing back part 3 is fitted to the core subassembly 1, the inner face of the back wall 301, together with the exposure frame 106 of the core subassembly 1 and the film guidance runners 106a, 106b thereof, forms a film guide channel A which is illustrated in section in FIG. 8, wherein the back of the film 201 is supported in the film guide channel A on the film contact pressure ribs 308 of the housing back part 3.

The housing back part 3 closes off the film supply chamber 102 and the film cartridge chamber 204, as well as the film guide channel A, at the back.

Housing Base Part

The housing base part 4 is described next. This is again injection moulded in one piece from a light-tight plastics material and is shaped so that it can be fitted from below to the underside of the core subassembly 1; this fitting operation is effected separately from the fitting of the housing back part 3 to the core subassembly. The housing base part 4 comprises an externally flat, smooth base wall 401, which on its inner face comprises a film supply chamber covering region 402 for covering the underside of the film supply chamber 102 of the core subassembly 1 and of the film supply roll 202, and which also comprises a film cartridge chamber covering region 404 for covering the underside of the film cartridge chamber 104 of the core subassembly 1 and the film cartridge 203 which is inserted therein. A trough 406 is provided in an intermediate region 405 of the base wall 401 situated between the film supply chamber covering region 402 and the film cartridge covering region 404, and serves to effect a certain downward enlargement of the cavity 117 in the core subassembly 1.

A break-off line 407 for bending the film cartridge chamber covering region 404 out of the plane of the base wall 401 extends in the intermediate region 405, in the vicinity of the film cartridge chamber covering region 404, and is invisible on the outer face of the base wall 401. As described in more detail below, this operation can be performed by inserting a tool in a small aperture 409 which is disposed in an edge region 408 of the base wall 401 adjacent to the film cartridge chamber covering region 404.

A hinge formed from the material of the base wall 401 can also be provided instead of the break-off line 407.

Functional Unit

In their assembled state, the core subassembly 1 with the film unit 2 inserted therein, the housing back part 3 which can be fitted to the core subassembly, and the housing base part 4 which can be fitted to the core subassembly 1 together form the functional unit FU, which is illustrated separately in FIG. 3.

As is explained in more detail below, the functional unit FU forms a light-tight compartment for the photographic film contained therein, and contains all the technical operating devices which are necessary for making a predetermined number of photographic recordings of objects on the film 201 without using a flash. It is only the shutter release diaphragm 512 for actuating the shutter release lever 112 of the core subassembly 1, as well as a viewing window 513 for reading the frame counter on the frame counter wheel 113, which are not located on the functional unit FU, but which are situated on the housing front part 5 instead.

Housing Front Part

The housing front part 5 is described next. This is again injection moulded in one piece from a plastics material, and is shaped to match the external dimensions of the functional unit FU and so that it can be fitted from the front to the front side of the functional unit FU, or, more precisely, to the front side of the core subassembly 1, and so that it adjoins and is flush with the housing back part 3 and the housing base part 4. The housing front part 5 comprises a front wall 501 which is slightly stepped externally, which is adjoined by side and top wall elements 502, 503 and 504 which project perpendicularly to the front wall 501 along the lateral edges and along the top edge thereof, which front edge parts surround the core subassembly 1 and adjoin and are flush with corresponding wall elements 302, 303 or 304 of the housing back part 3. The front wall 501 has apertures 505 and 506, which are disposed coaxially with the taking lens 109 or the viewfinder lens 110 when the housing front part 5 is fitted to the core subassembly 1. Moreover, an aperture 507 for receiving the shutter release diaphragm 512 and the viewing window 513 for reading the number on the frame counter wheel 113 of the core subassembly 1, which frame counter wheel is disposed underneath, are situated on the top wall element 504. A mounting eye 515, in which the mounting peg 115 of the core subassembly 1 fits when the housing front part 5 is fitted to the core subassembly 1, is injection moulded on the inner face of the front wall 501.

Light-tight and Similar Joints Between Subassemblies

Locking joints are provided between the core subassembly 1, the housing back part 3 and the housing base part 4 of the functional unit FU. These locking joints make contact along predetermined contact lines and are predominantly formed as labyrinth joints in order to screen the film supply chamber 102 and the film cartridge chamber 104 of the core subassembly 1, as well as the film guide channel A which runs between the core subassembly 1 and the housing back part 3 inside the functional unit FU, from unwanted extraneous light coming from the outside. In contrast, a light-tight seal is not necessary between the housing front part 5 and the subassemblies 1, 3 and 4 of the functional unit FU.

The locking joints between the core subassembly 1, the housing back part 3 and the housing base part 4, which are predominantly formed as light-tight joints, are each formed by interlocking elements and are predominantly formed by labyrinth elements which cooperate based on the tongue-and-groove principle.

The following elements are employed to form light-tight joints between the core subassembly 1 and the housing back part 3.

As can be seen from FIGS. 1 and 2, a continuous upper labyrinth groove 121 extends on the back of the main body 101 of the core subassembly 1 over the entire length of the main body 101, and consists of two horizontally extending sections and of a vertically extending section situated therebetween. This corresponds to a correspondingly formed upper labyrinth tongue 321 on the inner face of the housing back wall 301 of the housing back part 3. A lower labyrinth groove 122 extends horizontally on the back of the main body 101 of the core subassembly 1 below the lower film guidance runner 106*b*, between the film supply chamber 102 and the film cartridge chamber 104, and at its lateral ends has end regions 122*a*, 122*b* which extend perpendicularly downwards to the base. This lower labyrinth groove 122 corresponds to a correspondingly formed lower labyrinth tongue 322 on the inner face of the housing back wall 301, which has corresponding end regions 322*a*, 322*b* which extend perpendicularly towards the base.

Labyrinth tongues 123; 124, each of which corresponds to a correspondingly formed labyrinth groove 323 or 324, respectively, on the lateral edges of the housing back part 3, extend over the entire length of the vertical lateral edges of the main body 101. The corresponding labyrinth elements 121 and 321, 122 and 322; and 123, 124 and 323, 324, are aligned so that they interlock with each other when they are moved in relation to each other parallel to the optical axis of the taking lens 109 of the core subassembly 1. When the housing back part 3 is fitted to the core subassembly 1 from the back, i.e. in a direction parallel to the optical axis of the taking lens 109, the corresponding, interlocking labyrinth elements each form light-tight joints between the core subassembly 1 and the housing back part 3.

The following elements are employed to form light-tight joints between the core subassembly 1 and the housing back part 3 on the one hand and the housing base part 4 on the other hand.

As can be seen from FIGS. 1 and 2, a downwardly oriented labyrinth tongue 126, 127 extends on the core subassembly 1 on a bottom edge of the main body 101 between each of the lateral perpendicular labyrinth tongues 123, 124 and the horizontal lower labyrinth groove 122. These labyrinth tongues correspond to the cross-sectional shape of the film supply chamber 102 and of the film cartridge chamber 104 and follow the arcuate bottom edges of these regions. A further, horizontal locking tongue 325 which is oriented downwards towards the base and which extends horizontally and rectilinearly is situated on the housing back part 3 under the labyrinth tongue 322 which is forwardly oriented towards the core subassembly 1. At each of its two ends, this labyrinth tongue continues into labyrinth tongues 328, 329, which comprise adjoining end regions which are bent at right angles and which each extend, rectilinearly and in alignment with the middle locking al tongue 325, as far as the perpendicular lateral labyrinth grooves 323 and 324; respectively, and are likewise downwardly oriented.

The following labyrinth grooves, which are each raised and upwardly oriented, are formed on the inner face of the base wall 401 of the housing base part 4: arcuate labyrinth grooves 426, 427 which correspond to the labyrinth tongues 126, 127 on the core subassembly 1, as well as a rectilinear middle locking groove 425 which corresponds to the locking tongue 325 on the housing back part 3, and laterally adjoining labyrinth grooves 428, 429, which are rectilinear but which are bent at right angles at their respective ends, and which correspond to the labyrinth tongues 328, 329 on the housing back part 3. The locking groove 425 and the labyrinth grooves 428 and 429 form an overall groove which extends continuously and rectilinearly and which is only bent at its ends. Moreover, the labyrinth grooves 426 and 428 form a closed groove circuit round the film supply chamber covering region 402 of the base wall 401, whilst the labyrinth grooves 427 and 429 form a closed groove circuit round the film cartridge chamber covering region 404 of the base wall 401. The respective, corresponding locking or labyrinth elements 325 and 425, 126 and 426, 127 and 427, 328 and 428; and 329 and 429, are each aligned so that they interlock with each other when they are moved in relation to each other perpendicularly to the optical axis of the taking lens 109 of the core subassembly 1.

When the labyrinth tongues 126, 127 engage in the labyrinth grooves 426, 427, engagement also occurs between the bent end regions 122a, 122b of the labyrinth groove 122 of the core subassembly 1 and the bent end regions 322a, 322b of the labyrinth tongues 322 of the housing back part 3 in the somewhat widened sections 426a; 427a of the labyrinth grooves 426; 427 of the housing base part 4. In addition, the labyrinth tongue 126 of the core subassembly 1, together with the labyrinth tongue 328 of the housing back part 3 and the end region 122a of the labyrinth groove 122 of the core subassembly 1, the end face of which fits into the labyrinth groove 426, and the end region 322a of the labyrinth tongue 322 of the housing back part 3, form a closed circuit in the closed groove circuit round the film supply chamber covering region 402 of the inner base wall 401 which is formed by the labyrinth groove 426 and the labyrinth groove 428 on the housing base part 4. Similarly, the labyrinth tongue 127 of the core subassembly 1, together with the labyrinth tongue 329 of the housing back part 3 and the end region 122b of the labyrinth groove 122 of the core subassembly 1, the end face of which fits into the labyrinth groove 427, and the end region 322b of the labyrinth tongue 322 of the housing back part 3, form a closed circuit in the closed groove circuit round the film supply chamber covering region 404 of the inner base wall 401 which is formed by the labyrinth groove 427 and the labyrinth groove 429 on the housing base part 4. Due to these locking joints, the film supply chamber 102 and the film cartridge chamber 104 of the core subassembly, as well as the film guide channel A which runs therebetween, are completely screened at the bottom, at the face of the housing base part 4, from extraneous light coming from below.

Apart from the ring-like light-tight seals described above, which encircle the undersides of the film supply chamber 102 and the film cartridge chamber 104 of the core subassembly 1, the labyrinth groove 122 with its downwardly bent end regions 122a, 122b of the core subassembly 1, and the labyrinth tongue 322 with its downwardly bent end regions 322a, 322b of the housing back part 3, also contribute to the screening of the film compartment with its film guide channel A from light coming from below.

The additional engagement of the locking tongue 325 of the housing back part 3 in the locking groove 425 of the housing back part 4 is not in itself necessary in order to effect said screening of the film compartment with its film guide channel A from extraneous light coming from below. However, this locking joint between the locking elements 325 and 425 serves for the mechanical stabilisation of the housing back part 3 in the position shown in FIG. 8, so that the internal width of the film guide channel A in a direction parallel to the optical axis of the taking lens 109 is maintained even if the user of the camera unintentionally exerts pressure from the outside on the housing back part 3.

The regions 405 and 408 on the inner face of the base wall 401 of the housing base part 4 which is illustrated in a simplified manner in FIG. 6, and the cavity 117 above them which is formed on the core subassembly 1, are not protected from incident light from the outside. This is not a problem, however, because the film compartment in the camera, which was described above, is sealed from interfering extraneous light by the aforementioned light-tight joints. Therefore, it is also possible for the aperture 409 for prising open the film cartridge chamber covering region 404 of the housing base part 4, which is illustrated in FIG. 7 only, to be disposed in region 408 of the baseplate 401, since extraneous light from the outside which is incident through this aperture 409 cannot enter the film compartment of the functional unit FU.

As a modification of the embodiment described above, the mutually corresponding, interlocking grooves and tongues in the locking and labyrinth joints described above can also be provided in a mutually interchanged arrangement.

As a result of the sealing of the film compartment which was described above, the housing front part 5 does not need to consist of a light-tight material and the joints between the housing front part 5 and the functional unit FU do not need to be light-tight.

Locking and Clamping Joints Between Subassemblies

In order to fix the housing back part 3 to the core subassembly 1, a locking tab 130, 131 is provided on each of the side faces of the main body 101 of the core subassembly 1, whilst a locking aperture 330 or 331 is formed on each of the lateral, somewhat elastic wall elements 302, 303 of the housing back part 3. When the housing back part 3 is fitted to the core subassembly 1, the locking tabs 130, 131 of the core subassembly 1 engage in the locking apertures 330 or 331 of the housing back part 3, which results in a stable mechanical joint between the core subassembly 1 and the housing back part 3.

In order to fix the housing base part 4 to the core subassembly 1 and to the housing back part 3, locking apertures 133, 134 and 135 are provided on the underside of the main body 101 of the core subassembly 1, and a locking aperture 332 is provided on the housing back part, whilst two pairs of corresponding, upwardly projecting locking tongues 432, 433; 434, 435 are formed on the inner face of the base wall 401 of the housing base part 4. In addition, a locking tab 137 is provided on the core subassembly 1 on the side of the film cartridge chamber 104, whilst a corresponding locking aperture 437 is formed on the housing base part 4, on a lateral tab 436. When the housing base part 4 is fitted to the core subassembly 1 and to the housing back part, the locking tongue 432 of the housing base part 4 engages in the locking aperture 332 of the housing back part 3, whilst the locking tongues 433, 434 and 435 of the housing base part 4 engage in the locking apertures 133, 134 or 135 of the core subassembly 1. The locking tab 137 on the core subassembly 1 engages in the locking aperture 437 on the housing base part 4. This results in a stable mechanical joint between the core subassembly 1 and the housing back part on the one hand and the housing base part 4 on the other hand.

In order to provide further stabilisation, a clamping rib 438, which projects upwards from the base wall 401 and which comprises lateral clamping projections 439, 440, is provided on the housing base part 4 near the film guide channel. When the housing base part 4 is fitted to the core subassembly 1, these clamping projections are pushed between two angled guide projections 139, 140 situated on the core subassembly, so that an additional clamped joint is formed between the housing back part 3 and the core subassembly 1.

In order to fix the housing front part 5 to the core subassembly 1, a pair of locking tabs 141, 142 and 143, 144 is provided in each case on both sides of the core subassembly 1, whilst a pair of corresponding locking apertures 541, 542 or 543, 544 is provided on each of the sidewalls of the housing front part 5. In addition, a locking tab 345 is formed on the housing back part 3 and a corresponding locking aperture 345 is formed on the housing front part 5. When the housing front part 5 is fitted to the functional unit FU, the corresponding locking elements 345, 545 interlock.

As a modification of the embodiment described above, the mutually corresponding, interlocking locking tabs and locking apertures in the locking joints described above can also be provided in a mutually interchanged arrangement.

Assembly of the Functional Unit

As follows from the above description, assembly of the functional unit FU is effected in the following steps:

providing the core subassembly 1;

inserting a film unit 2 in the core subassembly 1 from the back thereof so that the film supply roll 202 is received by the film supply chamber 102 and the film cartridge 203 is received by the film cartridge chamber 104, and so that a film portion of the film 201 between the film supply roll 202 and the film cartridge 203 is seated against the film guidance runners 106a, 106b of the exposure frame 106;

fitting the housing back part 3 to the core subassembly 1 from the back in the direction of the optical axis of the taking lens 109 of the core subassembly 1; and fitting the housing base part 4 to the core subassembly 1 from below in a direction perpendicular to the lens axis of the taking lens 109.

In this procedure, the main body 101 of the core subassembly 1, the housing back part and the housing base part 4 are each in one piece, and the housing base part 4 is fitted separately from the housing back part 3 to the main body 101 of the core subassembly 1.

As mentioned above, when the housing back part 3 is fitted to the core subassembly 1 the recess 306 in the projection 305 of the housing back part 3 complements the U-shaped, semicircular recess 103 which is open at the back on the projection 103 of the film supply chamber 102 of the core subassembly 1 to form the approximately circular aperture B, as shown in FIG. 5. The aperture B which is thereby formed is approximately coaxial with a centre line of the film supply chamber 102 and with a centre line of the film supply roll 202 of the film unit 2 which is inserted therein, and its diameter is significantly less than the diameter of the film supply chamber 102. If a winding mandrel, which is not illustrated, is used as an auxiliary tool to form the film supply roll 202 before the camera is assembled, then as a consequence of the formation of the aperture B in the film supply chamber 102 of the core subassembly 1 said mandrel can remain in the film supply roll 202 when the film supply roll 202 is inserted in the film supply chamber 102 of the core subassembly 1 and during the subsequent fitting of the housing back part 3 to the core subassembly 1, so that it can be ensured that the film supply roll 202 does not unwantedly "run out" until the film supply chamber 102 is closed at the back by fitting the housing back part 3. After the housing back part 3 has been fitted to the core subassembly 1, the winding mandrel can then be pulled out through the aperture B. Subsequent loosening of the film supply roll 202 is then only possible to a limited extent due to the closure of the film supply chamber 102 at the back by the housing back part 3, and therefore cannot cause any problems. When the winding mandrel of the film supply roll 202 is pulled off, one edge of the latter is seated against the projections 103 and 305, and therefore cannot be entrained by the winding mandrel when the latter is pulled off, even if there is still a frictional joint between the winding mandrel and the innermost winding of the film supply roll 202 when the winding mandrel is pulled off.

During the assembly of the subassemblies 1, 3 and 4 which was described above, the light-tight film compartment which was described in detail above is formed in the functional unit FU, and comprises the film supply chamber 102 and the film cartridge chamber 104 of the core subassembly 1, and the film guide channel A which is formed between these two chambers and between the core subassembly 1 and the camera back part 3.

The functional unit FU which is illustrated in FIG. 3 contains all the components which are necessary for the light-tightness and operation of the camera, with the exception of the shutter release diaphragm 512 and the frame counter aperture 513, which are disposed on the housing front part 5. The functional unit FU therefore performs all the technical functions for the photographic recording of images, practically in the same way as a camera without a flash device.

The following components can alternatively be fitted to the front of the functional unit FU:

a housing front part 5 which is matched to the dimensions of the functional unit FU and with which the functional unit FU forms an operational camera without a flash device, or a housing front part 560, an extension section 561 of which protrudes beyond a lateral edge S of the functional unit FU, the extension section 561 of which together with a supplementary housing part 360 which can be inserted at the back between the functional unit FU and the extension section 561 encloses a receiver space E for a flash device 6 which is disposed at the side of the functional unit FU and which forms an operational camera with a built-in flash device, which is described in more detail in the following sections.

After it has been fitted to the functional unit FU, the housing front part 5 or the housing front part 560 closes off the cavity 117 formed on the core subassembly 1 at the front.

Formation of the Camera without a Flash Device

The functional unit FU can be completed in a further assembly step by fitting the housing front part 5, which is matched to the external dimensions of the functional unit FU, to an external, complete camera without a flash device. As shown in FIG. 9, the functional unit FU is thereby completed to form a camera with an external housing which is closed all round, without additional technical functions being created by fitting the housing front part 5, apart from the possibility of actuating the shutter release lever 112 of the functional unit FU by the shutter release diaphragm 512 of the housing front part 5 and apart from making it possible to read the number on the frame counter wheel 113 of the core subassembly 1 through the viewing window 513 of the housing front part 5. Therefore, the housing front part 5 only serves to complete the overall housing of the camera which is formed from the housing back part 3, the housing base part 4 and the housing front part 5, without contributing further to the light-tightness and operation of the camera (apart from the shutter release diaphragm and frame counter window).

The housing front part 5 can optionally be fitted to the functional unit FU either before or after the fitting of the housing back part 3 and/or of the housing base part 4 to the functional unit 1 from the front.

Formation of the Camera with a Flash Device

The functional unit FU described above can be used, without technical or external changes being made to it, to form a camera with a flash device. This can be achieved by fitting a modified housing front part 560, which has a section 561 which protrudes beyond a lateral edge S of the functional unit FU, to the functional unit FU instead of the housing front part 5 which is matched to the dimensions of the functional unit FU, and by providing a supplementary housing part 360 which adjoins the housing back part 3. This results in the formation of an additional housing space E at the side of the functional unit FU for receiving components of a flash device 6. This is described in more detail below with reference to FIGS. 11 to 16.

As emphasised above, the functional unit FU which is illustrated in FIG. 3 and which consists of the core subassembly, which is loaded with a film unit 2, of the housing back part 3 and of the housing base part 4 of the camera as shown in FIGS. 1 to 10, is used without any constructional modifications to form a camera with a flash device, and for this purpose is assembled in the manner described above.

The flash device 6 comprises a board 601 which has a larger aperture 615 and a smaller aperture 616, by means of which the board 601 is inserted on the mounting peg 115 and on the pin 116 of the core subassembly 1 and can thereby be mounted on the core subassembly 1 as shown in FIG. 12.

On its front side, the board 601 bears a flash tube 602 with a trough-shaped reflector 603 as well as a synchronous switch 604 which can be operated by the photographic shutter, which is not illustrated, of the core subassembly 1, and a charging switch which is also not illustrated but which is described in more detail below. Amongst other components, a laterally projecting, horizontally located storage capacitor 605 for storing an electrical charge for supplying the flash tube 602, as well as two backwardly projecting battery contact arms 606 and 607, are fixed to the back of the board 601. The electrical circuit of the flash device 6, which is not illustrated in the drawings, is also situated on the back of the board 601, which is constructed as a printed circuit board.

When fitted to the wall 114 of the functional unit FU, the board 601 protrudes beyond the adjacent edge S of the core subassembly as shown in FIGS. 11 and 12. When the board 601 is fitted on the mounting peg 115 and the pin 116 of the core subassembly 1 the capacitor 605 enters the cavity 117, which is present in the core subassembly 1 under the light well 105 and which is open at the front, before the housing front part 560 is fitted to the core subassembly 1, whilst the battery contact arms 606, 607 project backwards into the housing compartment E for the flash device 6.

With exception of its extension section 561 with the housing front part 5, the housing front part 560 which can be fitted to the functional unit FU 1 from the front is substantially identical to the design shown in FIGS. 1 to 10*a*. Accordingly, it covers the functional unit FU and has the same locking elements as the housing front part 5 in the design without the flash device. The housing front part 560 is locked to the functional unit FU by the same locking elements as those used in the camera without a flash device which is shown in FIGS. 1 to 10*a*. The only difference therefrom is that the locking apertures 541, 542 on the housing front part 560 are not disposed on a sidewall of the same, but are disposed on arms 562, 563 which project backwards from the inner face of the housing front part 560. Additional locking apertures 564, 565 are provided on a side face of the extension section 561 of the housing front part 560.

The housing front part 560 which is provided in the design shown in FIGS. 11 to 16 has an aperture 566 with a cover lens 567 on the section 561 which projects beyond the lateral edge S of the functional unit FU. When the housing front part 560 is fitted to the functional unit FU, the aperture and cover lens are aligned flush with the flash tube 602 and the reflector 603 of the board 601. The housing front part also has a switch button 568 which can be operated manually by the user of the camera and which is actively connected to the charging switch (not illustrated) of the board 601 for charging the capacitor 605.

The supplementary housing part 360 for the housing back part 3 is designed so that it covers a battery 609 of the flash device 6 when the battery has been inserted vertically from the back between the battery contact arms 606, 607. The supplementary housing part, 360 is fixed firstly to the housing back part 3 of the functional unit FU by means of a catch 361, which fits into the locking aperture 330 of the housing back part 3 and secondly to the extension section 561 of the housing front part 560 by means of two catches 364, 365 which fit into the lateral locking apertures 564, 565 of said extension section 561 of the housing front part 560.

The locking aperture 330 of the housing back part 3 of the functional unit is thus used twice, namely both by the engagement of the catch 130 of the core subassembly 1 and by the engagement of the catch 361 of the supplementary housing part 360, as illustrated on an enlarged scale in FIG. 14. The catches 130 and 361, which act in opposite directions of pulling, have flanks 130*a* and 361*a*, respectively, which are inclined in opposite directions, so that they rest in the locking aperture 330 of the housing back part 3 with these inclined flanks superimposed in a space-saving manner, as shown in FIG. 14.

The extension section 561 of the housing front part 560 and the supplementary housing part 360 on the housing back part 3 are shaped so that they complement each other in order to form the space E which is intended for receiving the flash device 6. The supplementary housing part 360, which serves as a cover for the battery 609 and which can be fitted separately, adjoins the back face of the housing back part 3 of the functional unit FU laterally without forming a larger step, as shown in FIG. 16. The top and bottom housing faces of the camera are also continued, by the extension section 561 of the housing front part 560 and by the supplementary housing part 360, to the housing back part 3 almost without the formation of larger steps, as shown in FIGS. 15 and 16.

It is also possible, in a simple manner, subsequently to convert a ready assembled camera without flash device, as illustrated in FIGS. 9 and 10, for example, into a camera with a flash device 6, for which purpose the housing front part 5 of the camera shown in FIGS. 1 to 10 simply has to be removed by detaching the locking elements 141, 142, 143 and 144, and after fitting the board 601 and the other parts of the flash device 6 to the functional unit FU a housing front part 560 with a laterally protruding extension section 561 is fitted, and after inserting a battery 609 at the back a back supplementary housing part 360 is fitted as a battery cover, whereby a camera as shown in FIGS. 11 to 16 is formed from a camera as shown in FIGS. 1 to 10*a*. Modifications to the functional unit FU or the temporary removal of the housing back part 3 and/or of the housing base part 4 from the core subassembly 1 of the functional unit FU are not necessary for this purpose. Moreover, the film unit 2 which is inserted in the functional unit FU during the initial assembly thereof is unaffected.

Even though FIG. 10*a* only illustrates the operation of removing the film cartridge 203 in connection with the camera without a flash device, the operation of removing the film cartridge from the camera with a flash device as shown in FIGS. 11 to 16 is performed in the same way. In this respect, it is particularly advantageous that during the opening operation for removing the film cartridge 203 which is illustrated in FIG. 10*a* it is only the relatively small film cartridge chamber covering region 404 of the base wall 401 of the housing base part 4 of the functional unit FU which is lifted off, whilst the larger, remaining part of the base wall 401 remains fixedly attached to the core subassembly 1 of the functional unit FU. Persons who are responsible for opening the camera in a developing and printing organisation are thereby protected from inadvertently accessing the storage capacitor 605 the of flash device 6, so that a residual electrical charge which may possibly still be stored therein cannot have a harmful effect on these persons when the film cartridge is removed.

Opening the Camera to Removed the Film Cartridge

In order to open the camera without a flash device as shown in FIGS. 1 to 10*a* or the camera with a flash device as shown in FIGS. 11 to 16 after the correct use thereof by the user, and after delivering it to a developing and printing organisation for the removal of the film cartridge 203 with the rolled-up film 201 therein which has been exposed image by image, a simple tool, which is not illustrated in the drawings, is inserted in the aperture 409 of the housing base part 4 in order to bend the film cartridge chamber covering region 404 of the housing base part 4 downwards by swivelling it about the break-off line 407 as shown in FIG. 10*a*. The film cartridge 203 can then be removed from the film cartridge chamber 104 of the core subassembly 1 through the aperture formed in the housing base part 4, and can thus be removed from the camera.

This operation is facilitated because the labyrinth joints between the housing base part 4 and the core subassembly 1, and between the housing base part 4 and the housing back part 3, interlock in a direction perpendicular to the optical axis of the taking lens in order to form the light-tight joint between these subassemblies, and the film cartridge chamber covering region 404 of the housing base part 4 is also lifted off in a direction perpendicular to said optical axis when removing the film. Thus no forces transverse to the direction of engagement of these labyrinth joints are exerted on the labyrinth joints this operation.

For this reason, the camera can be opened with a comparatively slight application of force. When the film is removed, the core subassembly 1, the housing back part 3 and the housing front part 5 are generally not destroyed, which at least makes it possible to reuse these subassemblies subsequently and thus contributes to an enhancement in the environmental compatibility of the disposable camera described above.

The mechanism of opening the camera without a flash device which is shown in FIG. 10*a* is also applicable in an identical manner to the camera with a flash device as shown in FIGS. 11 to 16.

Modifications

The principle according to the invention, namely of forming a camera with or without a flash device from a functional unit FU designed for recording photographic images by alternatively fitting different parts to the functional unit FU according to the teaching of claim 1, also extends to include the situation where the functional unit FU is not constructed as a type of disposable camera, but is provided for the formation of a camera for repeated use by the end user, with the insertion and removal of the film unit used in each case then being undertaken by the end user.

Instead of the projections 103 and 305 which were described above in the region of the film supply chamber 102, only one of these projections can be provided. Instead of being semicircles, the projections 103 or 305 can also exist in a rudimentary form, e.g. in the form of radial inwardly oriented pins or the like, and can thus extend over an angular range which is significantly less than 180°.

Instead of the film units 2 which are used in the embodiment described above and which comprise a 35 mm roll film based on the "135" small image film system, film units can also be provided which are formed based on other known film systems, e.g. on the known APS film system.

List of Reference Numerals

1 core subassembly
101 main body
102 film supply chamber
103 bottom wall element in film supply chamber
103*a* recess in bottom wall element
104 film cartridge chamber
105 light well
106 film exposure frame
106*a* top film guidance runner
106*b* bottom film guidance runner
107 film advance wheel
108 sprocket wheel
109 taking lens
110 viewfinder lens
111 viewfinder eyepiece
112 shutter release lever
113 frame counter wheel
114 wall of the film supply chamber
115 mounting peg
116 pin
117 cavity
121 upper labyrinth groove
122 lower labyrinth groove facing housing back part
122*a* left bent portion of labyrinth groove
122*b* right bent portion of labyrinth groove
123, 124 lateral labyrinth tongues
126, 127 lower arcuate labyrinth tongues
130 lateral locking tab
130*a* back face of lateral locking tab
131 lateral locking tab
133 locking aperture
134, 135 pair of locking apertures
137 lateral locking tab
139, 140 guide projections
141, 142 pair of lateral locking tabs
143, 144 pair of lateral locking tabs

2 film unit
201 film
202 film supply roll
203 film cartridge
204 cartridge mouth
205 film spool coupling part

3 housing back part
301 back wall
302, 303 side wall elements
304 top wall element
305 bottom wall projection
306 semicircular edge of bottom wall projection
307 slot-shaped advance wheel aperture
308 film contact pressure ribs
311 viewfinder eyepiece aperture
321 upper labyrinth tongue
322 lower labyrinth tongue
322*a* left bent portion of labyrinth tongue
322*b* right bent portion of labyrinth tongue
323, 324 lateral labyrinth grooves
325 lower middle labyrinth tongue
328, 329 lower lateral labyrinth tongues 330, 331 lateral locking apertures
332 locking aperture
345 locking tab
360 supplementary part for housing back part
361 catch
361a back face of catch
364, 365 catches 4 housing base part
401 baseplate
402 film supply chamber covering region
404 film cartridge chamber covering region
405 baseplate intermediate region
406 trough
407 break-off line
408 baseplate edge region
409 tool aperture prising open
425 middle rectilinear labyrinth groove
426, 427 arcuate labyrinth grooves
426a widened section in labyrinth groove 426
427a widened section in labyrinth groove 427
428, 429 lateral labyrinth grooves
432, 433 pair of locking tongues
434, 435 pair of locking tongues
436 lateral tab
437 lateral locking aperture
438 clamping rib
439, 440 pair of clamping projections
5 housing front part
501 front wall
502, 503 side wall elements
504 top wall element
505 aperture for taking lens
506 aperture for viewfinder lens
507 aperture for release diaphragm
512 shutter release diaphragm
513 viewing window for frame counter read-off
515 mounting eye
541, 542 pair of lateral locking apertures
543, 544 pair of lateral locking apertures
545 locking aperture
560 extended housing front part
561 extension section
562, 563 arms for locking apertures
564, 565 lateral locking apertures
566 flash aperture
567 cover lens
568 switch button for flash charging switch 6 flash device
601 board
602 flash tube
603 reflector
604 synchronous switch
605 storage capacitor
606, 607 battery contact arms
609 battery
615 larger board aperture
616 smaller board aperture Abbreviations A film guide channel
B aperture on film supply chamber
E space for flash device
FU functional unit
S lateral edge of functional unit

What is claimed is:

1. A camera subassembly which is designed for recording, through an image-taking lens (109) provided at a front side thereof, images on a photographic film (201) disposed in a light-tight manner therein, which camera subassembly (FU) is provided to enable attaching to said front side thereof, selectively a first type housing front part (5) or a second type housing front part (560), wherein said first type housing front part (5), when attached to the front side of said camera subassembly (FU) so as to cover said front side, is matched to dimensions of said camera subassembly, and said camera subassembly (FU) together with said first type housing front part (5) forms a photographic camera not including a flash device; and said second type housing front part (560), when attached to the front side of said camera subassembly (FU) so as to cover said front side, by an extension section (561) protrudes beyond a lateral edge (S) of said camera subassembly (FU), which extension section (561) together with a supplementary housing part (360) insertable at a back side thereof between said camera subassembly (FU) and said extension section (561), surrounds a receiver space (E) provided for housing at least part of components of a flash device (6), and said camera subassembly (FU) together with said second type housing front part (560) and together with said supplementary housing part (360) forms a photographic camera including a flash device.

2. A camera subassembly according to claim 1, comprising a core subassembly (1) with a film supply chamber (102) for receiving a film supply roll (202), a film cartridge chamber (104) for receiving a film cartridge (203), a film exposure frame (106) disposed between the film supply chamber and the film cartridge chamber, a film advance device (107) for advancing a photographic film from the film supply chamber (102) via the film exposure frame (106) to a film cartridge (203) disposed in the film cartridge chamber (104), and a taking lens (109) which depicts an object to be photographed in the region of the film exposure frame (106).

a housing back part (3) which can be fitted to the core subassembly (1) from the back in the direction of the optical axis of the taking lens (109), and a housing base part (4) which can be fitted as a whole to the core subassembly (1) from below in a direction perpendicular to the optical axis of the taking lens (109), wherein the core subassembly (1) forms a light-tight film compartment with the housing back part (3) and the housing base part (4).

3. A camera subassembly according to claim 2, wherein the core subassembly (1) and the housing back part (3) fitted thereto on the one hand and the housing base part (4) which can be fitted thereto on the other hand form locking joints (325 and 425, 126 and 426, 127 and 427, 328 and 428; and 329 and 429), the parts of which interlock with one another in a direction perpendicular to the optical axis of the taking lens (109).

4. A camera subassembly according to claim 2, wherein the light-tight film compartment formed by the core subassembly (1) with the housing back part (3) and the housing base part (4) is restricted to the film supply chamber (102), the film cartridge chamber (104) and a film guide channel (A) which runs therebetween.

5. A camera subassembly according to claim 2, wherein the housing base part (4), which is of one-piece construction and is fitted to the core subassembly (1), comprises a film supply chamber covering region (402) which is a light-tight fit and a film cartridge chamber covering region (404) which is a light-tight fit, whilst a region (405) of the housing base part (4) which is provided therebetween is not closed off in a light-tight manner.

6. A camera subassembly according to claim 2, wherein first locking elements (122, 122a, 122b, 322, 322a, 322b) are provided between the housing back part (3) and the core subassembly (1) and second locking elements (325, 425) are provided between the housing back part (3) and the housing base part (4), in a region between the film supply chamber (102) and the film cartridge chamber (104) of the core subassembly (1), along an edge, which is adjacent to the housing base part (4), of a film guide channel (A) formed between the core subassembly (1) and the housing back part (3).

7. A camera subassembly according to claim 2, wherein locking elements (122, 322), which extend between the core subassembly (1) and the housing back part (3), along an edge, which is adjacent to the housing base part (4), of a film guide channel (A) formed between the core subassembly (1) and the housing back part (3), comprise sections (122a, 122b, 322a, 322b) which are bent down towards the housing base part (4) and which engage in widened sections (426a, 427a) of locking elements (426, 427) of the housing base part (4).

8. A camera subassembly according to claim 2, wherein the housing base part (4), which is of one-piece construction and which is fitted to the core subassembly (1), comprises a film cartridge chamber covering region (404) which is a light-tight fit, whilst a region (408) of the housing base part (4) which is provided at the side thereof is not a light-tight fit and comprises an aperture (409) for receiving a tool for lifting the film cartridge chamber covering region (404) from the core subassembly (1).

9. A camera subassembly according to claim 2, wherein the housing base part (4), which is of one-piece construction and which can be fitted to the core subassembly (1), comprises a film cartridge chamber covering region (404), which in order to open the film cartridge chamber (104) about a break-off line (407) or hinge pin can be moved in a direction opposite to the direction of engagement of locking joints (325 and 425, 126 and 426, 127 and 427, 328 and 428; and 329 and 429) which are provided for fitting the housing base part (3) or the housing back part (4) to the core subassembly (1).

10. A camera subassembly according to claim 9, wherein locking elements (434, 435) of the housing base part (4) are disposed in part along a break-off line (407) or along a hinge for opening the film cartridge chamber (104) of the core subassembly (1).

11. A camera subassembly according to claim 2, wherein the interlocking elements of the locking joints are formed by tongues and grooves.

12. A camera subassembly according to claim 2, wherein locking joints between the core subassembly (1) and the housing back part (3), between the core subassembly (1) and the housing base part (4) and/or between the housing back part (3) and the housing base part (4), form light-tight labyrinth joints.

13. A camera subassembly according to claim 2, wherein the core subassembly (1) and the housing back part (3) comprise locking elements (130, 131, 330, 331) which effect mutual locking when the housing back part (3) is fitted to the core subassembly (1) in the direction of the optical axis of the taking lens (109).

14. A camera subassembly according to claim 13, wherein the locking elements (330, 331) of the housing back part (3) are disposed on lateral faces thereof.

15. A camera subassembly according to claim 2, wherein the core subassembly (1) and the housing base part (4) of one-piece construction comprise locking elements (133, 134, 135, 137; 432, 433, 434, 435, 437) which effect mutual locking when the housing base part (4) is fitted to the core subassembly (1) in a direction perpendicular to the optical axis of the taking lens (109).

16. A camera subassembly according to claim 1, wherein said first type housing front part (5) and said second type housing front part (560) have locking means (541, 542) structured and arranged at either of said first type and second type housing front parts (5, 560) in an equal manner; and said camera subassembly (FU) comprises locking means (141, 142) adapted to cooperate with corresponding locking means (541, 542) of either of said first type housing front part (5) and said second type housing front part (560), respectively, when selectively attached to said camera subassembly (FU).

17. A photographic camera comprising a camera subassembly (FU) and a first type housing front part (5), each of them being designed as specified in claim 1, wherein said first type housing front part (5) is attached to said camera subassembly (FU) so as to form a camera not including a flash device.

18. A photographic camera according to claim 17, wherein said first type or second type housing front part (5, 560), respectively, can be fitted to a core subassembly (1) of said camera subassembly (FU), independently of a housing back part (3) thereof, in a direction in parallel to the optical axis of said image-taking lens (109).

19. A photographic camera according to claim 17, wherein said first type or second type housing front part (5, 560), respectively, can be fitted to a core subassembly (1) of said camera subassembly (FU), independently of a housing base part (4) thereof, in a direction in parallel to the optical axis of said image-taking lens (109).

20. A photographic camera according to claim 17, wherein a core subassembly (1) of said camera subassembly (FU) comprises a mounting peg (115) engaging a mounting eye (515) of said first type or second type housing front part (5, 560), respectively, when said first type or second type housing front part (5, 560), respectively, is fitted to said camera subassembly (FU).

21. A photographic camera comprising a camera subassembly (FU) and a second type housing front part (560), each of them being designed as specified in claim 1, wherein said second type housing front part (560) is attached to said camera subassembly (FU) so as to form, together with said supplementary housing part (360), a camera including a flash device.

22. A photographic camera according to claim 21, wherein a circuit board (601) of a flash device (6) included in said camera, is fixed to said mounting peg (115) fitting into an aperture (615) of said circuit board (601).

23. A photographic camera according to claim 22, wherein said core subassembly (1) comprises an additional mounting pin (116) fitting into a further aperture (616) of said circuit board (601), for securing said circuit board (601) on said core subassembly (1).

24. A photographic camera according to claim 21, wherein the extension section (561) of said second housing front part (560) comprises an aperture (566) with a cover lens (567) disposed in front of a flash tube (602) of the flash device, when said second type housing front part (560) is attached to said core assembly (1) of said camera subassembly (FU).

25. A photographic camera according to claim 21, wherein said supplementary housing part (360) comprises locking elements for locking with a core subassembly (1) of said camera subassembly (FU) and with said extension section (560) of said second type housing front part (560).

26. A photographic camera according to claim 21, wherein said extension section (561) of said second type housing front part and said supplementary housing part (360) together form a bottom and/or top face adjoining a bottom or top face of said housing base part (4) or a top face of camera substantially continuously.

27. A photographic camera according to claim 21, wherein a locking element (330) of the housing back part (3) cooperates both with a locking element (130) of the core subassembly (1) and with a locking element (361) of the supplementary housing part (360).

28. A photographic camera according to claim 27, wherein the locking element (330) of the housing back part (3) forms a locking aperture into which both the locking element (130) of the core subassembly (1) fits, which locking element is formed as a locking tab, and into which the locking element (361) of the supplementary housing part (360) fits which is also formed as a locking tab, wherein back faces (130a, 361a) of the locking tabs, which faces are inclined in opposite directions, are seated against each other.

29. A photographic camera according to claim 21, wherein a back face of the supplementary housing part (360) adjoins a back face of the housing back part (3).

30. A photographic camera according to claim 21, wherein the supplementary housing part (360) forms a cover for a battery (609) of the flash device (6) which is inserted in the receiver space (E).

31. A method of assembling a photographic camera with a photographic film inserted therein, comprising the following steps in the sequence given below:

providing a core subassembly (1) comprising a film supply chamber for receiving a film supply roll, comprising a film cartridge chamber for receiving a film cartridge, a film exposure frame disposed between the film supply chamber and the film cartridge chamber, comprising a film advance device for advancing a photographic film from the film supply chamber via the film exposure frame to film cartridge disposed in the film cartridge chamber, and comprising a taking lens which depicts an object to be photographed in the region of the film exposure frame, wherein a photographic film unit (2) is inserted in the core subassembly (1), fitting a housing back part (3) to the core subassembly (1) from the back in the direction of the optical axis of the taking lens, and fitting a housing base part (4) to the core subassembly from below in a direction perpendicular to the lens axis, wherein a light-tight film compartment is formed by the core subassembly together with the housing back part and the housing base part.

32. A method according to claim 31, wherein a first type housing front part (5) is fitted to the core subassembly from the front before fitting the housing back part and/or the housing base part.

33. A method of converting a photographic camera without a flash device, which is assembled according to claim 32, into a photographic camera with a flash device, comprising the following steps:

removing the first type housing front part (5), which is matched to the dimensions of the core subassembly (1), from the core subassembly (1), fitting a circuit board (601) of a flash device (6), which comprises backwardly projecting contact arms (606, 607), to the core subassembly (1), fitting a second type housing front part (560), which comprises an extension section (561) which protrudes laterally beyond an edge of the core subassembly (1), to the core subassembly (1), insetting a battery (609) from the back between the contact arms (606, 607) of the circuit board (601), and fitting a supplementary housing part (360) to the core subassembly (1) from the back and fitting the extension section (561) of the housing front part (560).

34. A method according to claim 31, wherein a second type housing front part (560) is fitted to the core subassembly from the front after fitting the housing back part and/or the housing base part.

35. A method according to claim 31, comprising the following additional steps:

fitting a circuit board (601) of a flash device (6), comprising backwardly projecting contact arms (606, 607), to the core subassembly (1), fitting a second type housing front part (560), which comprises an extension section (561) which protrudes laterally beyond an edge (S) of the core subassembly (1), to the core subassembly (1), insetting a battery (609) from the back between the contact arms (606, 607) of the circuit board (601), and fitting a supplementary housing part (360) from the back to the core subassembly (1) and to the extension section (561) of the housing front part (560).

* * * * *